United States Patent [19] [11] 4,005,998
Gorman [45] Feb. 1, 1977

[54] SEPARATION PROCESS
[75] Inventor: John E. Gorman, Houston, Tex.
[73] Assignee: Shell Oil Company, Houston, Tex.
[22] Filed: Apr. 1, 1976
[21] Appl. No.: 672,803

Related U.S. Application Data
[63] Continuation-in-part of Ser. No. 549,268, Feb. 12, 1975, abandoned.

[52] U.S. Cl. .................................. 55/84; 55/242;
55/267; 55/426; 55/431; 55/454; 55/459 R;
209/144
[51] Int. Cl.² ........................................ B01D 45/16
[58] Field of Search ...... 55/1, 80, 84, 92, 235–238,
55/263, 265, 267, 431, 448–451, 454, 459 R,
459 A, 459 B, 459 C, 459 D, 466, 242, 426;
209/144, 211; 210/512 R; 261/79 A; 159/4 R,
4 S, 4 VM, 48

[56] References Cited
UNITED STATES PATENTS

| 1,798,510 | 3/1931 | Winslow et al. | 55/426 |
| 2,034,023 | 3/1936 | Cheltnam et al. | 55/466 |
| 2,346,005 | 4/1944 | Bryson | 210/512 R |
| 2,684,232 | 7/1954 | Caldwell | 55/459 |
| 2,799,208 | 7/1957 | Scott | 55/454 |
| 2,846,024 | 8/1958 | Bremi | 55/454 |
| 2,869,677 | 1/1959 | Yellott et al. | 55/431 |
| 3,440,806 | 4/1969 | Dramatowski | 55/449 |
| 3,740,929 | 6/1973 | Gordon et al. | 55/431 |
| 3,753,336 | 8/1973 | Drew et al. | 55/242 |
| 3,804,145 | 4/1974 | Arnold et al. | 159/48 R |
| 3,951,620 | 4/1976 | Frischmuth, Jr. | 55/1 |

FOREIGN PATENTS OR APPLICATIONS

| 1,501,363 | 11/1969 | Germany | 55/237 |
| 148,023 | 10/1961 | U.S.S.R. | 55/459 R |

Primary Examiner—Frank W. Lutter
Assistant Examiner—David L. Lacey
Attorney, Agent, or Firm—Dean F. Vance

[57] ABSTRACT

Particulate solids are separated from their admixture with gases or vaporized liquids by passage through a specially designed cyclone separator wherein the solids are passed down the separator to a plate modified with a circumferential groove leading to a solids outlet, the plate also having a centrally located vertical member designed to minimize turbulent flow of the solids/vapor mixture and fouling of the apparatus.

2 Claims, 6 Drawing Figures

SEPARATION PROCESS

This application is a continuation-in-part of applicant's copending application Ser. No. 549,268, filed Feb. 12, 1975, now abandoned.

BACKGROUND OF THE INVENTION

A number of processes for the production of synthetic polymers involve the preparation of particulate solids of the polymers as an end product initially suspended in gases such as steam, or vaporized liquids such as low molecular weight hydrocarbons. These mixtures are produced in many ways but those especially contemplated here involve the conversion of reaction mixtures comprising solutions of a polymer which are passed through contacting devices resulting in vaporization of solvents and formation of the particulate solids suspended in the vapor. In many cases, this vaporization is affected by contact with high-temperature vapors such as steam, or hot inert gases, such as nitrogen.

The use of ordinary cyclones for separating these solids from the gaseous suspensions has often been found to be unsatisfactory, particularly when the particles tend to adhere either to each other or to the interior surfaces of the separation apparatus while they are in a heated condition. Experience has shown that improvements in the apparatus are desired with respect to greater reduction in fouling, since downtime of the apparatus for the purpose of cleanout constitutes a substantial charge against the economics of the process.

STATEMENT OF THE INVENTION

Now, in accordance with this invention, a novel cyclone separator construction is provided including a cylindrical barrel section having a tangentially positioned feed inlet (jet contactor) and a gas outlet in the upper part thereof, a tangentially positioned solids outlet in the bottom portion thereof, a bottom plate with an interior circumferential groove leading to the solids outlet adjacent to the plate and, as the special aspect of this invention, a centrally-positioned, vertically disposed means on said plate for reducing turbulence in the bottom area of the cyclone. Still in accordance with this invention, a further improvement in fouling reduction is affected by positioning a waterport in this vertically disposed means for the injection of water to cool the lower portion of the cyclone.

In further accordance with the present invention, a separation process is provided utilizing the above and hereinafter described apparatus, the special feature of the process being the reduction in turbulence of the gases and solid particles in the lower section of the separator by the centrally located vertically disposed means.

This turbulence-reducing means may take a number of alternative forms, some typical examples of which are illustrated in the drawings. The simplest form is that of a standpipe or post set vertically in the center of the bottom plate of the separator. However, many geometrical variations of this elementary shape are possible within the generic concept of the invention. For example, to minimize fouling it is a desirable aspect throughout to weld the standpipe or post to the essentially flat bottom plate in such a way that a sloping shoulder is formed by the welding material or an added auxiliary sleeve so that a smooth arcuate transition free from sharp angles is formed. More sophisticated shapes may be used, such as a cone having either flat sides or concave sides; the cone either being truncated or culminating in point.

The Drawings forming a part of the specification include

FIG. 1 which is a sideview of the assembled separator.

The jet contactor may take a number of forms, including that described in Arnold et al., U.S. Pat. No. 3,804,145. As described in that patent, cements comprising polymers such as synthetic elastomers dissolved in solvents such as cyclohexane or other normally volatile hydrocarbon or mixtures thereof are passed at high speed and/or high shear as a thin film through a jet, exiting preferably at vapor speeds of at least 700 ft. per second. The cement is heated prior to this ejection either or both by heating the cement or contacting it in the contacting apparatus with a hot gas such as steam or nitrogen or the like. The contactor, according to this invention, is positioned in the upper part (top half) of the cylindrical barrel and is directed to project a tangential stream of solid particulates suspended in gases which may include steam, inert normally gaseous fluids, and vaporized solvents. The upper portion or top of the cylinder, preferably the upper ⅓ of the cylinder, is fitted with a vapor outlet for removal of a large preponderance of the vapors and gases. The particulate solids proceed down the essentially vertical walls of the cylinder in a tangential path and arrive at a bottom plate, which has a circumferential groove adjacent thereto or integral therewith leading to a tangentially positioned solids outlet. Without this guiding groove, the hot solids apparently bounce off the bottom plate and barrel walls in an erratic manner. This causes a retardation of the speed of their movement which encourages them to settle on the surfaces of the apparatus and causes fouling of the latter, resulting in frequent cleanouts.

Figure 1:
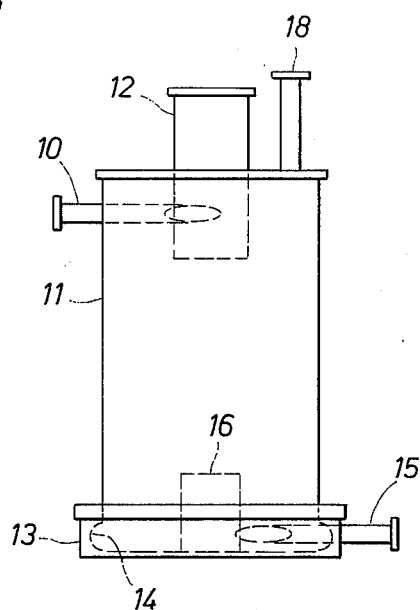
Figure 4:
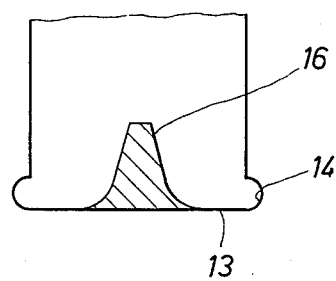
FIGS. 2 through 5 are cross-sectional views of alternative forms of the vertically disposed turbulence-reducing member.
Figure 2:
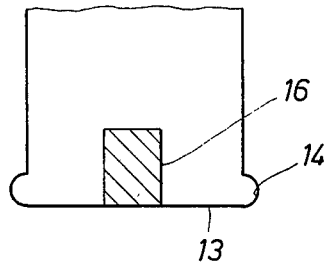
Figure 5:
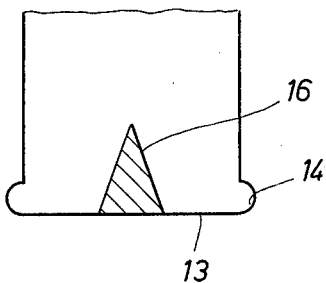
Figure 3:
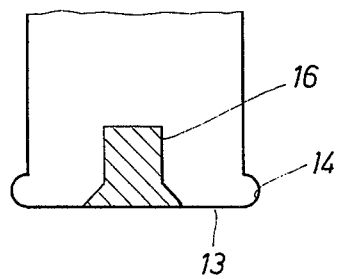

FIG. 1 illustrates an arrangement of the cyclone apparatus of this invention. According to FIG. 1, a jet inlet 10 is positioned in the upper portion of the cylindrical barrel 11 so as to introduce particular solids-laden gases or vapors tangentially into the barrel. The mixture proceeds at high speeds of at least about 700 ft. per sec. (preferably at least 1,000 ft. per sec.) at the jet inlet in a tangential path down the inner walls of the cylinder, a large proportion of the vapors and gases escaping through the vapor outlet 12. The particle solids proceed down the lower portion of the barrel 11 to a bottom plate 13 which is fitted with the circumferential groove 14 leading to the tangentially positioned solids outlet 15. The bottom plate is also fitted with the centrally-located vertically-disposed member 16 designed for turbulence reduction. The temperature in the cyclone typically varies from about 100° to about 300° F.

As referred to hereinabove, FIGS. 2 through 5 show several alternatives in cross-section of suitable shapes of the vertically-disposed turbulence reducing member 16 which is positioned centrally on the bottom plate 13 and associated with the circumferential groove 14.

Figure 6:
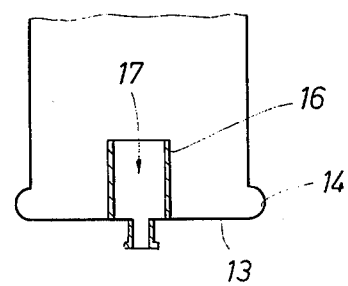
FIG. 6 is a cross-sectional view of the vertical turbulence-reducing member modified by a central channel for injection of water.

FIG. 6 shows a refinement of this apparatus by the additional element 17 which is an inlet port for water. The rate of water injection varies from about 0.5 to about 3.5 parts by weight per 100 parts by weight of solids.

In accordance with one preferred aspect of the process of this invention, the above-described apparatus also is modified with a water inlet 18 positioned in the upper portion, preferably upper ⅓, of the barrel section. The purpose of this inlet is to introduce a sufficient amount of water in liquid state into the hot mixture of gases and solids to reduce the temperature of the mixture so as to minimize the fouling which may occur from contact of overheated particles with the apparatus. This water injection also serves to aid in minimizing fouling which may occur when treating polymers which are very sticky. The rate of water injection also varies from about 0.5 to about 3.5 parts by weight per 100 parts by weight of solids.

It was found, however, that the injection of liquid water in the upper portion of the barrel reduced fouling in that portion by temperature reduction, but did not provide appreciable temperature reduction in the lower portions of the barrel since most of the water vaporized in the upper portion of the barrel and passed out through the vapor outlet. Consequently, a liquid water inlet 17, preferably through the vertically-disposed turbulence-reducing means was devised. This was found to make a substantial reduction in temperature and reduced fouling, apparently due both to the temperature reduction and to a scouring action of water droplets which mechanically removed sites of incipient fouling.

The present apparatus and process is suitable for the separation of particles from gases and vapors of a wide variety. These include thermoplastic polymers such as polystyrene, polyethylene and polypropylene; rubbers such as polyisoprene or polybutadiene as well as styrene/butadiene copolymers; and most especially block copolymers, typified by but not restricted to, block copolymers such as polystyrene-polybutadiene-polystyrene and their hydrogenated derivatives. The polymers may be treated without any further modification or they may be combined as desired with extending ingredients including oils, plasticizers, resins or other polymers. The present apparatus is especially suitable for separating sticky particles such as the above block copolymers from gases and vapors.

The gases or vapors from which the solids are separated in this process normally will be vaporized solvents in which the polymers were dissolved prior to ejection through the jet contactor 10. Such solvents include mixed pentenes, mixed pentanes, cyclohexane, toluene and mixtures thereof. Steam may or may not be utilized in conjunction with the jet-contacting.

A number of tests were run employing for this purpose solutions of the above-identified block copolymer dissolved in cyclohexane. The polymer was modified with about 55 phr of the rubber-extending mineral oil. The cement contained about 37% by weight of polymer including oil. The apparatus described with reference to FIG. 1 was employed with a centrally placed vertically-disposed turbulence-reducing member consisting of a standpipe which was 3 ½ inches in diameter and about 5 inches tall, the entire interior of the cyclone being about 9 inches in diameter and about 18 inches tall. The temperature in the cyclone was about 200° F. The apparatus was operated continuously for 15 hours with no fouling, indicating that it could be employed without cleanout for a number of days or weeks. Injection of 1–3 parts by weight of water per 100 parts by weight of polymer through the standpipe 16 resulted in a reduction of about 20° F in the temperature of the lower section of the apparatus, and visual inspection during the time of water injection showed that some of the water was tangentially thrown to the walls and resulted in virtually complete scouring of the same number of polymer particles which adhered momentarily to the sides of the separator.

The vertically-disposed turbulence-reducing member is preferably of such a proportion that its top end will terminate in the lower 50% of the vertically positioned separator. Therefrom the minimum height of this member should be such that it terminates higher than the level of the solids exit. The lateral proportions are such that between about 30 and about 55% of the separator barrel diameter is occupied by the vertical member particularly when it is essentially cylindrical.

What is claimed is:

1. A process for the separation of polymeric particulate solids from their heated admixture with gases in a vertically-disposed cylindrical separator having an upper section and a lower section, said lower section terminating in an interior circumferential groove containing a tangentially-positioned solids outlet, which process comprises:
    a. injecting the admixture at a vapor velocity of at least about 700 feet per second through from a jet inlet positioned tangentially in said upper section;
    b. withdrawing the major portion of said gases through a gas outlet positioned in said upper section;
    c. passing the solids and residual portions of the gases in a tangential path down the inner surface of said cylindrical separator to a bottom plate communicating with said interior circumferential groove, said bottom plate having centrally-positioned thereto a vertically-disposed means for reducing turbulence in the flow pattern of the solids and residual gases, said vertically disposed means having a water inlet for injection of water into the lower section of the separator;
    d. injecting water through said water inlet at a rate of between about 0.5 and 3.5 parts by weight per 100 parts by weight of solids; and
    e. withdrawing the solids through said tangentially-positioned solids outlet.

2. A process according to claim 1 wherein said particulate solids are block copolymers and said gases are vaporized solvent and steam.

* * * * *